Nov. 13, 1928.
F. SCHWARTZ
1,691,084
DEVICE FOR INDICATING DENSITY OF LIQUIDS
Filed Oct. 6, 1926
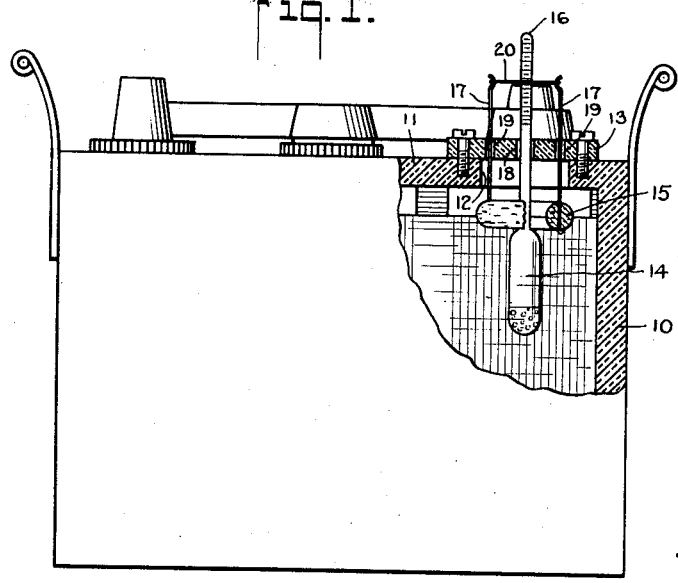
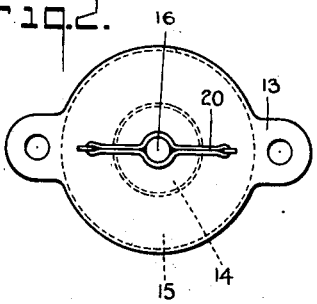
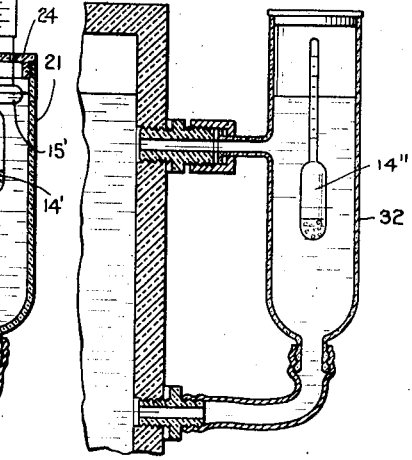
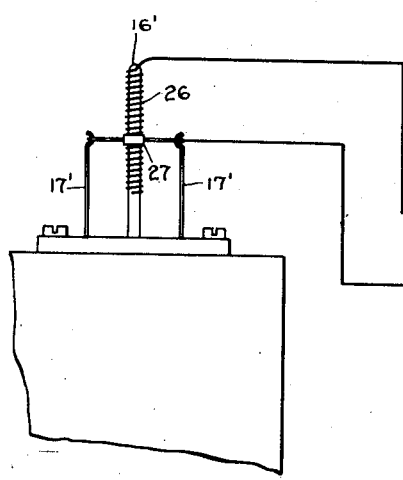
INVENTOR
Frank Schwartz
BY
Frederick Breitenfeld
his ATTORNEY Patented Nov. 13, 1928.

1,691,084

UNITED STATES PATENT OFFICE.

FRANK SCHWARTZ, OF NEW YORK, N. Y.

DEVICE FOR INDICATING DENSITY OF LIQUIDS.

Application filed October 6, 1926. Serial No. 139,934.

My present invention relates to indicating devices in the nature of hydrometers, and has particular reference to a device designed for association with a container, such as a storage battery, to indicate the specific gravity of the liquid therein.

Although I have illustrated, and shall hereinafter describe, my invention as applied to storage batteries, nevertheless it will be understood that as to certain phases of my invention an application of this character is not essential.

It is an object of the invention to provide an indicating device which will continuously indicate or record the specific gravity of a liquid within a container, it being contemplated that the device will be permanently associated with a container, such as a battery, in a manner whereby the continuously occurring density alteration of the liquid will always be indicated.

It is an important object of the invention to provide a device whose indication will be accurate regardless of the liquid level within the container. With this object in view, it is a feature of the invention to provide an arrangement wherein an indicating device responsive to density alterations, will cooperate with a relatively fixed device which is responsive to liquid level variations.

Briefly, one preferred form of my invention contemplates the employment in cooperative relation of at least two bodies floatable in the liquid and variably constructed so that changes in the liquid density will cause relatively different movements of the bodies, means being provided in association with the bodies for indicating said differences.

In another embodiment, a single floatable body is provided whose movements are indicatable with reference to the absolute level of the liquid, as contradistinguished from an indication with reference to a fixed portion of the container.

In one form of construction, the means for indicating the different movements of the bodies may comprise an arrangement of cooperating scales. In another embodiment, the means is electrical in nature, causing the differences in movement to manifest themselves by the fluctuation of an electrical meter.

One feature of the invention lies in providing a pair of bodies whereof one is relatively long and narrow and the other is relatively short and wide, the latter being preferably of annular shape and arranged to embrace the former.

In one form of the invention, these bodies are arranged in association with the container proper, whereas in a modified form they are arranged in association with an auxiliary chamber designed to be associated with the container proper.

In general, it is an object of the invention to provide a device of the character described, whose structure is extremely simple and whose manufacture is therefore inexpensive; and whose operation is extremely efficient and unlikely to become impaired. It is also an object to provide the device in a structural form which is simple, yet staunch and effective.

For the attainment of the foregoing objects and such other objects as may hereinafter appear or be pointed out, I have illustrated several embodiments of the invention in the accompanying drawings in which—

Fig. 1 is a front elavational view of a storage battery having my device associated therewith; a portion of the front wall of the battery being broken away to reveal the interior;

Fig. 2 is a plan view of a portion of Fig. 1;

Fig. 3 is a view similar to Fig. 1, showing a modification;

Fig. 4 is another view similar to Fig. 1, showing a further modification; and

Fig. 5 illustrates another modification.

Referring to the drawings and particularly to Figs. 1 and 2, it will be observed that I have shown a battery having a container 10 which is illustrative of the type of container to which my invention is applicable. The container 10 has a top wall 11 which is provided with an opening 12, the latter opening being normally sealed by a cover plate 13 having a configuration substantially as shown in Fig. 2.

Within the liquid and disposed beneath the cover plate 13, are two floatable bodies 14 and 15, the former having an enlarged lower portion and a relatively narrow and elongated or rod shaped upper portion 16. The member 15 is relatively wide and short, and preferably comprises a ring-shaped body positioned to encircle the body 14.

Supported upon spaced portions of the body 15 are two supports or rods 17 which project upwardly. Both the supports 17 and the elongated portion 16 extend through the top wall of the container so as to position themselves exteriorly thereof and in relatively visible positions. For this purpose, the cover plate 13 is provided with three aligned openings, the center one 18 thereof being suitable to permit passage therethrough of the portion 16, and the outer ones 19 being suitably arranged to permit passage therethrough of the rods 17.

Preferably, the rods 17 are supported by diametrically opposed portions of the body 15, and the openings 18 and 19 are therefore in alignment.

It will be obvious that essentially the bodies are so relatively constructed and arranged that the differences in their movements, as the density of the liquid changes, will be directly indicated thereby. More particularly, the bodies are provided with relatively proximate indicating portions exemplified by the portion 16 and the rods 17. The bodies being variably constructed either as to weight or cross-sectional area, one thereof (in the embodiment shown, the body 15) will move relatively little as the density changes, whereas the other thereof (the body 14) will move a relatively great distance.

Various means may be provided for indicating this difference. In the embodiment shown in Figs. 1 and 2, I have provided an indicating element in the form of a looped wire 20 spanning the upper ends of the rods 17 and constructed to encircle the portion 16. This wire thereby provides an additional guide or support for the portion 16, and also constitutes a relatively fixed device which is responsive to liquid level changes. I have also shown the portion 16 provided with indicating marks, and thereby constituting an indicating portion whose movements relative to the wire 20 will accurately record the density variations of the liquid.

Referring now to Fig. 3, it will be observed that I have shown a similar arrangement in association with an auxiliary chamber 21, this chamber being arranged in communication with the main chamber in such a manner that the liquid will occupy said auxiliary chamber. More particularly, it will be observed that I have shown two connections 22 and 23 comprising tubular arrangements of suitable construction and arranged to place an upper and lower portion of the auxiliary chamber 21 in communication with an upper and lower portion of the main chamber.

The chamber 21 is provided with a cover plate 24 having openings therein similar to the openings 18 and 19, and within the chamber 21 the relatively floatable bodies 15' and 14' are arranged. In this embodiment, I have shown a graduated plate or scale 25 associated with the rods extending upwardly from the body 15', and I have shown a single indicating mark upon the upper portion of the body 14''. This indicating mark may, if desired, be formed by the upper end of the body 14', and it will be observed that in this embodiment the relative movements of this indicating mark over the scale 25 will record the absolute density change. It will be noted that in an embodiment of this form, the body 14' may be made relatively smaller in length, and thereby the danger of breakage because of an upwardly projecting portion will be avoided. It will also be noted that the auxiliary chamber 21 may be associated with a container, such as a battery, after the latter has already been manufactured. It is contemplated that my invention embodied in an auxiliary chamber may, if desired, be associated with storage batteries already in use.

In Fig. 4 I have illustrated a modification wherein the indicating means is electrical by nature. The structure is substantially similar to that of Fig. 1, except that a resistance coil 26 is provided upon the upper portion 16' of one body, and a suitable contact member 27 is carried by the rods 17' of the second body. The resistance coil 26 is arranged within an electrical circuit 28 comprising a switch 29, a meter 30, a source of energy 31, and the contact 27. Essentially, therefore, it will be observed that the circuit 28 is normally closed, and that the relative movements of the bodies will alter the characteristics of the circuit. More particularly, it will be obvious that the relative movements of the bodies will cause the contact 27 to move over the resistance coil 26, thereby altering the resistance of the circuit and causing the meter 30 to record such alteration.

The particular advantage of the embodiment shown in Fig. 4 lies in the possibility of recording density change, and consequently electrical charge of a storage battery, by means which are wholly independent of the electrical circuit within the storage battery. In other words, if a meter, such as the meter 30 were associated electrically with the storage battery directly, its constant association would cause a loss of charge to be constantly taking place. In accordance with my invention, the meter 30 may, if desired, be calibrated to record ampere-hours, and this recordation will be accurate, and no loss in charge will be entailed during the constant recordation.

In Fig. 5 I have shown a modification wherein an auxiliary chamber 32 is provided similar to the chamber 21 of Fig. 3, but wherein the second body corresponding to the body 15 has been omitted. A single body 14'' is provided, and its indication of density change is rendered independent of liquid level by causing the liquid level itself to constitute the indicating device hereinbefore referred to as being responsive to level changes. In this embodiment, the chamber 32 is made of transparent material, such as glass, and the relative position of the body within the liquid may be readily observed at any time. It will be noted that this relative position will record accurately, because the changing level of the liquid will be a factor which does not affect the reading.

It will be obvious that many changes in the details herein described and illustrated for the purpose of explaining the nature of my invention may be made by those skilled in the art without departing from the spirit and scope of the invention as expressed in the appended claims. It it therefore intended that these details be interpreted as illustrative and not in a limiting sense.

Having thus described my invention and illustrated its use, what I claim as new and desire to secure by Letters Patent is—

1. In a storage battery, a device for continuously indicating the density of the liquid, said device comprising two floating bodies within the liquid, one of said bodies encircling the other and having different characteristics of submersion per density-change, the cover of said battery having suitable spaced openings therein, and said bodies having indicating portions extending outwardly through said openings into mutually proximate positions, the indicating portion associated with the encircling body serving to retain the latter against rotation.

2. In a storage battery, a device for continuously indicating the density of the liquid, said device comprising two floating bodies within the liquid, one of said bodies encircling the other and having different characteristics of submersion per density-change, the cover of said battery having a group of spaced openings therein, and said bodies having indicating portions extending outwardly through said openings, said indicating portions including a set of spaced supports mounted upon the encircling body, whereby the latter is prevented from rotating.

3. In a storage battery, a device for continuously indicating the density of the liquid, said device comprising two floating bodies within the liquid, one of said bodies encircling the other and having different characteristics of submersion per density-change, the cover of said battery having a group of spaced openings therein, and said bodies having indicating portions extending outwardly through said openings, said indicating portions including a rod-shaped portion carried by the encircled body, a set of spaced supports mounted upon the encircling body on opposite sides of the rod-shaped portion, and an indicating element spanning the free ends of said spaced supports.

4. In a storage battery, a device for continuously indicating the density of the liquid therein, said device comprising a cover portion having three aligned openings therein, a pair of floating bodies beneath said cover portion and variably constructed so that changes in the liquid density will cause relatively different movements of the bodies, one of said bodies encircling the other and said other body being rod-shaped and extending up through the intermediate opening, supports carried by spaced portions of the encircling body and extending up through the other two openings, and an indicating element spanning the free ends of said supports and extending past the free end of said rod-shaped body in close proximity to the latter.

In witness whereof, I have signed this specification this 29th day of September, 1926.

FRANK SCHWARTZ.